Patented Jan. 9, 1951

2,537,177

UNITED STATES PATENT OFFICE 2,537,177

DYEING OF VINYL AND VINYLIDENE RESINS WITH ACID DYES DISSOLVED IN CERTAIN GLYCOL ETHERS AND ESTERS

Jackson A. Woodruff, St. Davids, Pa., assignor to American Viscose Corporation, Wilmington, Del., a corporation of Delaware No Drawing. Application November 6, 1945, Serial No. 627,105

5 Claims. (Cl. 8—4)

This invention relates to methods of dyeing hydrophobic vinyl and vinylidene resins with water-soluble acid and direct cotton or rayon dyes.

The vinyl and vinylidene resins, of which copolymers of vinyl halides and vinyl esters, copolymers of vinyl chloride and acrylonitrile, copolymers of vinylidene chloride and vinyl chloride, polyacrylonitrile, polyvinylidene halides, polyvinyl acetates, and the acrylate and alkacrylate resins generally are important and typical examples, are all characterized by the property of pronounced hydrophobicity, having water absorption and retaining capacities of not more than 1%, and in some instances less than 1%. This property of water-repellency is, from some viewpoints, highly desirable and enhances the value of the resins for many special purposes. For instance, "Vinyon," which is a copolymer of vinyl chloride and vinyl acetate, has a water pick up and retention capacity of about .01%, and is extremely useful for special applications on that account.

While the water-repelling character of the resins, which amounts to practically absolute hydrophobicity in some cases, is of value, it greatly complicates the problem of obtaining good dyeings and the resins have been restricted in use because, up to the present, no method has been available for dyeing the resins, or articles formed from or comprising the resins, whereby dyeings which fully satisfy the demands of the trade as to resistance to rubbing, migration and washing with soap, are obtained.

Various methods of dyeing the vinyl and vinylidene resins have been investigated. For example, the resins have been dyed from aqueous dispersions of the water-insoluble direct dispersol type cellulose acetate dyes containing solvents or swelling agents for the resins, but, in the case of the vinyl and vinylidene resins, the cellulose acetate type dyestuffs do not give dyeings which are fast to light, resistant to rubbing and resistant to migration. The organic derivatives of cellulose are entirely different from the vinyl and vinylidene resins both in chemical constitution and physical properties, which accounts for the difference in the results obtained when the respective materials are dyed with the cellulose acetate dyestuffs. Cellulose acetate, for example, although not as hydrophilic as, say, regenerated cellulose, nevertheless has a water absorbing and retaining capacity of 7%, which is high when compared to the poor water absorbing and retaining capacity of the vinyl and vinylidene resins, and permits dyeing of the acetate from aqueous dispersions. There the problem is merely one of selecting a suitable dispersing agent for the particular water-insoluble dye which it is desired to use in a given case.

In direct contrast to experience had with cellulose acetate, it has been found that satisfactory dyeings are not obtained when the vinyl and vinylidene resins are dyed from aqueous dispersions of the water-insoluble direct cellulose acetate dyestuffs, with or without the use of special solvents or swelling agents for the resins. Dyeings obtained on the resins from aqueous dispersions of the water-insoluble cellulose acetate dyes have inferior fastness to light, resistance to crocking, and resistance to soaping. Additionally, when articles formed from the vinyl and vinylidene resins are dyed from aqueous dispersions of water-insoluble dyes containing solvents or swelling agents for the resins, if the article is thereafter placed in contact with other materials having an affinity for the dye, the dye migrates from the resin even at room temperature, with resultant lightening or fogging of the surface.

Dyeings obtained on the vinyl and vinylidene resins with basic dyestuffs, whether water-soluble or not, or with the oil-soluble dyes are also unsatisfactory. The dyeings thus obtained are of no practical value, being characterized by poor fastness to light, poor resistance to migration, and particularly in the case of the basic dyestuffs, which may be water-soluble, extremely poor resistance to crocking, regardless of the dyeing method used. Moreover, I have found that when vinyl resins or vinylidene resins are dyed with the water-soluble basic dyestuffs, for instance, from solutions of the dyes in a mixture of acetone and methanol, the dyeings not only lack fastness, but the fibers have a delustered appearance which cannot be avoided even when the fibers are rinsed with organic solvents immediately upon removal thereof from the dyebath.

Water soluble acid and direct cotton or rayon dyestuffs are known and constitute extremely important classes of dyes. They have many advantages over the water-insoluble direct dispersol cellulose acetate dyestuffs, the water-soluble basic dyes, and the oil-soluble dyes, by way of superior fastness to light, resistance to crocking, resistance to strong soaping and resistance to migration. The acid dyes have substantivity for and are widely used in dyeing wool, silk and other animal fibers, while the direct cotton or rayon dyes have substantivity for and are widely used in the dyeing of cotton, linen, regenerated cellulose, wool and silk.

Conventionally, these dyestuffs are applied from water or aqueous media, the dye being carried into the wool, regenerated cellulose or the like by the water or aqueous media absorbed by the hydrophilic material.

It has not heretofore been considered possible to dye the vinyl and vinylidene resins with the water-soluble acid or direct cotton or rayon dyes. I have found that those resins cannot be dyed with the water-soluble acid or direct cotton or rayon dyes from solutions thereof containing water, and that the imbibition of the dyes from the bath by the resins is completely inhibited even when baths comprising large excesses of a dyeing assistant and only minute amounts of water are used. In a four-component system consisting of a vinyl or vinylidene resin, a solvent or swelling agent for the resin, a water-soluble acid or direct cotton or rayon dye, and water, the dye remains with the water, which does not enter the resin, no matter how long the resin is maintained in contact with the bath, and irrespective of variations in the concentration of the dye, temperature conditions, etc. Articles formed from the vinyl or vinylidene resins may be immersed in dyebaths consisting of a solution of the water-soluble acid or direct cotton or rayon dyes in solvents or swelling agents for the resins for protracted periods, and if water is present, the article will not even be tinted, despite the fact that the surface of the article is dissolved or swollen by the solvent or swelling agent.

Up to now, the vinyl and vinylidene resins, such as "Vinyon" have been employed, for the most part, for purposes where the character of the dyeings has not been too critical, and articles formed therefrom and dyed from aqueous dispersions of the readily available and comparatively cheap water-insoluble cellulose acetate dyestuffs have been used, even though the dyeings have not been wholly satisfactory. Now, with the increasing utilization of these resins for purposes where fast dyeings are important, the demand for dyed articles having improved fastness has become intensified. It is particularly important to dye the resins with the water-soluble acid and direct cotton or rayon dyes, because such dyes, once they are applied, have superior fastness to light, resistance to strong soap solutions such as are used in fulling operations in the textile industry, resistance to mechanical rubbing, and resistance to migration.

It is the primary object of the present invention to provide articles comprising or consisting of the vinyl or vinylidene resins impregnated with water-soluble acid or direct cotton or rayon dyes which are sealed within the resin. Another object is to provide a method of rapidly dyeing the vinyl or vinylidene resins to any desired shade in any desired color with water-soluble acid or direct cotton or rayon dyes.

I have now found that it is possible to dye the hydrophobic vinyl or vinylidene resins with the water-soluble acid and direct cotton or rayon dyes from solutions of the dyes in water-miscible non-aqueous liquids which dissolve the dyes in concentrations of at least .01%, and which are absorbed by the resin in amounts of from about 20% to 50% without exerting a solvating effect on the resin or destroying the fiber structure of the resin fibers. By reason of the large volume of the dye solvent which is absorbed by the resin, the resin is quickly brought to a highly swollen or extended state, so that the dye, which is not soluble in the resins, is carried into the resin by the absorbed liquid, and distributed throughout the resin in a very short time of the order of not more than about five minutes for full deep shades, and lesser periods for lighter shades, the dyeing being accomplished while the resin is in the swollen condition and before the liquid, if it tends to hygroscopicity when exposed to the air for a long time can pick up sufficient moisture to interfer with the dyeing, which must be carried out under essentially anhydrous conditions. Non-aqueous liquids which dissolve the water-soluble acid and direct cotton or rayon dyes in concentrations of at least .01%, and which can be absorbed by the vinyl or vinylidene resins in amounts of from 20% to 50%, on the weight of the resin, without dissolving the resin or destroying the structure of the resin fibers during dyeing, and which are particularly suitable for my purposes, are the esters and ethers, both aliphatic and aromatic, of alkylene-substituted polyhydric alcohols, such as the mono-ethyl, methyl and benzyl ethers of ethylene glycol, diethylene glycol monoacetate, the ethyl and methyl ethers of diethylene glycol, etc., which liquids may be used individually or in admixture with one another.

Dyeings of any desired shade, from pale to deep full shades, may be obtained, using dyebaths consisting of solutions of water-soluble acid or direct cotton or rayon dyes in the non-aqueous, but at least partially water-miscible liquids of the type indicated. The intensity of color or depth of shade is controlled by the extent of solubility of the dye in the non-aqueous liquid or mixture of liquids selected for use as swelling agent, the concentration of the dye in the bath, and the amount of swelling liquid which may be absorbed by the resin without dissolving the latter, which amount is at least 20% on the weight of the resin. Since the specific solubility varies with individual dyes of the water-soluble acid and direct cotton or rayon dye classes, and the amount of swelling liquid which is absorbed by the resin without dissolving the same will also vary between about 20 to 50% depending upon the particular resin, the choice of swelling liquid will be determined by the specific properties of the dye selected for use with any particular vinyl or vinylidene resin, and the properties of the resin. The dye may be used in concentrations ranging from about .01% up to 2% or more.

The temperature of the dyebath may vary somewhat, but when fibers which have been stretched are to be dyed, it is preferred to maintain the dye solution at a controlled temperature below the temperature at which the internal stresses developed by the stretching tend to be relieved, in order to avoid shrinkage of the fibers to an extent greater than is permissible for practical purposes. Thus, in the case of stretched fibers formed from a copolymer of vinyl chloride and vinyl acetate, the dye solution is preferably maintained at a temperature not greater than about 65° C., but the upper limit will depend, in each case, on the particular resin of which the fibers is formed.

When the vinyl and vinylidene resins are dyed with a water-soluble dye from non-aqueous media consisting of a solution of the dye in swelling agents for the resins as disclosed herein the dye is carried into the resin and permanently sealed therein, despite the fact that the water-soluble acid and direct cotton or rayon dyes, whether in dry or water-wet condition, do not show substantivity for or solubility in the resin, even when held in contact therewith for long periods. The dyeings are exceptionally fast to light when exposed in a fadeometer for 50 hours or longer. The fastness to light of medium and heavy shades is greatly improved as compared to the fastness of medium and heavy shades obtained when the resins are dyed from aqueous dispersions of water-insoluble cellulose acetate dyestuffs containing a dyeing assistant.

Typical water-soluble direct cotton or rayon dyes which may be used in dyeing the vinyl and vinylidene resins in accordance with the invention are:

C. I. #326—Benzo Fast Orange WSA
        Pontamine Turquoise 8 GL
Pv. 24—Benzo Fast Black LA
Pv. 71—Diphenyl Fast Blue GLN Typical acid dyes include:

Pv. 12—Alizarine Supra Blue A
C. I. 430—Polar Red RS
        Polar Brilliant Blue GAW
Pr. 143—Gycolon Black GAW
C. I. 246—Calcocid Blue Black Ex The resins may be in any form or shape, such as fibers, whether stretched or unstretched, yarns formed therefrom, whether in the form of skeins or wound packages such as cops, pirns, cheeses, as well as running lengths of the filamentary material, fabricated structures, molded articles, films, plates, etc. Fibers formed from the vinyl or vinylidene resins and which are subjected to stretching prior to dyeing thereof are found to be evenly dyed at all portions along their length, when dyed in accordance with the present invention.

An outstanding feature of this invention, aside from the possibility of dyeing the vinyl and vinylidene resins with the water-soluble acid or direct cotton or rayon dyes and the superiority of the dyeings obtained as compared to dyeings obtained with water-insoluble cellulose acetate dyestuffs, water-soluble basic dyes, or oil-soluble dyes, is that, after dyeing, excess dye may be removed from the vicinity of the surface of the dyed article by simply rinsing the article with water. Since the acid and direct cotton or rayon dyes are more soluble in water than in the essentially anhydrous swelling agent for the resin in which the dye is dissolved, it might be expected that during the rinsing step at least some of the dye with which the resin is impregnated would be dissolved. However, I have found that once the water-soluble dye is carried into the resin by the dye solvent which is a swelling agent for the resin, rinsing with water removes the excess dye from the vicinity of the surface of the article without in any way affecting the dye sealed in the resin which is not dissolved out or precipitated. This is of particular advantage because the use of water or aqueous media as a rinse great simplifies the dyeing procedure and reduces its cost.

Since during dyeing, the resin absorbs a large amount of the swelling liquid and, when fibers which have been stretched are dyed, the amount of dyebath absorbed may effect excessive shrinkage of the stretched fibers, it is preferred to maintain such fibers, or fabricated structures containing the same, under a light but constant tension while they are in contact with the dyebath, so that shrinkage is held at a minimum.

Surprisingly, when articles comprising or consisting of vinyl halide-vinyl ester copolymers, for instance, are dyed from solutions of the water-soluble acid or direct cotton or rayon dyes, from an essentially anhydrous medium consisting of a solution of the dye in a liquid which is absorbed by the resin in amounts of from 20% to 50%, to bring the same into highly swollen, extended condition, and thereafter rinsed with water to remove surface dye and excess swelling liquid, the dyeings obtained, of whatever depth of shade, show resistance to strong soap solutions, and resistance to mechanical rubbing which are superior to the corresponding properties shown by the same dyes on wool, regenerated cellulose rayon, or cotton, for which the dyes have substantivity. Thus, when a skein formed from yarns consisting of a copolymer of vinyl chloride and vinyl acetate was immersed in a non-aqueous dyebath consisting of a 2% solution of Diphenyl Fast Blue GLN in ethylene glycol mono ethyl ether at 100° F. for five minutes, and thereafter removed from the bath, squeezed to remove excess liquid, rinsed thoroughly with water, and dried at about 160° F. for about one hour, the yarns were found to be dyed a full deep blue which was unaffected by light when exposed in a fadeometer for a prolonged period, and which was completely resistant to soaping and mechanical rubbing under all conditions. Similar results were obtained when skeins formed from yarns consisting of the copolymer were immersed in a non-aqueous dyebath consisting of a 2% solution of Calcocid Blue Black Ex, under the same conditions, and thereafter rinsed with water and dried as described.

A further outstanding advantage of the invention, is that, under the conditions as described herein, the resin fibers are not delustered as a result of the dyeing operation, and have a most desirable appearance.

Single water-soluble acid or direct cotton or rayon dyes may be used, or a combination of different dyes may be dissolved in the selected swelling liquid or mixture of liquids, to give a variety of shades and colors.

The bodies to be dyed may be immersed in the dyebath, padded or sprayed therewith, or the dye solution may be applied in any other manner known to the art.

I claim:

1. The method of dyeing fibers, yarns, and other structures formed from a resin selected from the group consisting of hydrophobic vinyl and vinylidene resins having a water absorption and retaining capacity not greater than 1% which comprises dyeing the resin structure, at temperatures below the shrinkage temperature for the resin, in an anhydrous medium consisting of a solution of a water-soluble acid dye which has no affinity for the resin in a swelling liquid for the resin which, at temperatures below the shrinkage temperature for the resin, is absorbed by the resin structure in an amount of from 20% to 50%, based on the weight of the structure, without dissolving the resin, and which dissolves the dye in concentrations of at least .01%, said liquid being selected from the group consisting of ethylene glycol mono-ethyl ether, ethylene glycol mono-methyl ether, ethylene glycol mono-benzyl ether, diethylene glycol mono-acetate, diethylene glycol mono-ethyl ether, and diethylene glycol mono-methyl ether, to thereby cause the water-soluble acid dye to be dispersed within the body of the resin structure, rinsing the dyed structure with aqueous media to remove excess dye from the surface of the structure without loss of the dye dispersed within the body of the structure, and thereafter drying the dyed structure.

2. The method of dyeing fibers, yarns, and other structures formed from a resin selected from the group consisting of hydrophobic vinyl and vinylidene resins having a water absorption and retaining capacity not greater than 1%, which comprises dyeing the resin structure at temperatures below the shrinkage temperature for the resin, in an anhydrous medium consisting of a solution of a water-soluble acid dye which has no affinity for the resin in ethylene glycol mono-ethyl ether, to thereby cause the water-soluble acid dye to be dispersed within the body of the resin structure, rinsing the dyed structure with aqueous media to remove excess dye from the surface of the structure without loss of the dye dispersed within the body of the structure, and thereafter drying the dyed structure.

3. The method of dyeing fibers, yarns, and other structures formed from a resin selected from the group consisting of hydrophobic vinyl and vinylidene resins having a water absorption and retaining capacity not greater than 1%, which comprises dyeing the resin structure at temperatures below the shrinkage temperature for the resin, in an anhydrous medium consisting of a solution of a water-soluble acid dye which has no affinity for the resin in diethylene glycol mono-acetate, to thereby cause the water-soluble acid dye to be dispersed within the body of the resin structure, rinsing the dyed structure with aqueous media to remove excess dye from the surface of the structure without loss of the dye dispersed within the body of the structure, and thereafter drying the dyed structure.

4. The method of dyeing fibers, yarns, and other structures formed from a resinous copolymer of vinyl chloride and vinyl acetate having a water absorption and retaining capacity not greater than 1%, which comprises dyeing the copolymeric structure, at temperatures below the shrinkage temperature for the resin, in an anhydrous medium consisting of a solution of a water-soluble acid dye which has no affinity for the copolymer, in diethylene glycol mono-acetate, to thereby cause the water soluble acid dye to be dispersed within the body of the copolymeric structure, rinsing the dyed structure with aqueous media to remove excess dye from the surface of the structure without loss of the dye dispersed within the body of the structure, and thereafter drying the dyed structure.

5. Method of dyeing fibers, yarns, and other structures formed from a resinous copolymer of vinyl chloride and acrylonitrile having a water absorption and retaining capacity not greater than 1%, which comprises dyeing the copolymeric structure, at temperatures below the shrinkage temperature for the resin, in an anhydrous medium consisting of a solution of a water-soluble acid dye which has no affinity for the resin in ethylene glycol mono-ethyl ether, to thereby cause the water-soluble acid dye to be dispersed within the body of the copolymeric structure, rinsing the dyed structure with aqueous media to remove excess dye from the surface of the structure without loss of the dye dispersed within the body of the structure, and thereafter drying the dyed structure.

JACKSON A. WOODRUFF.

REFERENCES CITED

The following references are of record in the file of this patent:

UNITED STATES PATENTS

| Number | Name | Date |
| --- | --- | --- |
| 1,968,855 | Rivat | Aug. 7, 1934 |
| 2,219,313 | Hoare | Oct. 29, 1940 |
| 2,252,821 | Thompson | Aug. 19, 1941 |
| 2,259,515 | Croft | Oct. 21, 1941 |
| 2,260,543 | Smith | Oct. 28, 1941 |
| 2,274,751 | Sowter | Mar. 3, 1942 |
| 2,374,034 | Nichols | Apr. 17, 1945 |

OTHER REFERENCES

Heymann, "Vinyon Synthetic Fibers," article in Amer. Dyestuff Rep. for Oct. 27, 1941. Pages 575, 578.